(12) United States Patent
Blanchard et al.

(10) Patent No.: US 7,770,458 B2
(45) Date of Patent: Aug. 10, 2010

(54) METHOD OF DETECTING DAMAGE TO AN ENGINE BEARING

(75) Inventors: Serge Blanchard, Melun (FR); Julien Griffaton, Paris (FR)

(73) Assignee: SNECMA, Paris (FR)

( * ) Notice: Subject to any disclaimer, the term of this patent is extended or adjusted under 35 U.S.C. 154(b) by 343 days.

(21) Appl. No.: 12/039,345

(22) Filed: Feb. 28, 2008

(65) Prior Publication Data

US 2008/0223135 A1 Sep. 18, 2008

(30) Foreign Application Priority Data

Mar. 12, 2007 (FR) .................................. 07 53755

(51) Int. Cl.
*G01M 13/02* (2006.01)
*G01M 13/04* (2006.01)
(52) U.S. Cl. .............................. 73/659; 73/660; 702/56
(58) Field of Classification Search ................... 73/658, 73/659, 660, 593; 702/56
See application file for complete search history.

(56) References Cited

U.S. PATENT DOCUMENTS

| | | | | |
|---|---|---|---|---|
| 5,511,422 | A * | 4/1996 | Hernandez | 73/593 |
| 6,351,714 | B1 * | 2/2002 | Birchmeier | 702/56 |
| 6,553,837 | B1 * | 4/2003 | Lysen | 73/579 |
| 2004/0186680 | A1 * | 9/2004 | Jin et al. | 702/147 |
| 2004/0199348 | A1 * | 10/2004 | Hitchcock et al. | 702/92 |
| 2007/0032966 | A1 * | 2/2007 | Song | 702/35 |

FOREIGN PATENT DOCUMENTS

| | | |
|---|---|---|
| DE | 197 02 234 A1 | 8/1998 |
| EP | 1 111 364 A1 | 6/2001 |
| WO | WO 02/089305 A1 | 11/2002 |

* cited by examiner

*Primary Examiner*—Hezron Williams
*Assistant Examiner*—Rose M Miller
(74) *Attorney, Agent, or Firm*—Oblon, Spivak, McClelland, Maier & Neustadt, L.L.P.

(57) ABSTRACT

The invention relates to a method of detecting damage in a bearing supporting at least one rotary shaft of an engine in rotation, the method consisting in: defining a measurement period corresponding to a range of speeds of rotation of the shaft during renewable activity at low speeds of operation of the engine; acquiring over the entire measurement period a vibratory signal representative of acceleration of components of the engine; sampling the vibratory signal as a function of the speed of rotation of the shaft during the measurement period; transforming the sampled vibratory signal into a frequency signal to obtain frequency spectrum lines as a function of the speed of rotation of the shaft; calculating the mean of the amplitudes of the spectrum lines; determining amplitude peaks around multiples of the theoretical frequency of a damaged roller; calculating the ratio between each amplitude peak and the amplitude level determined for a sound bearing; and comparing the ratio that is obtained with at least one predetermined damage threshold.

5 Claims, 5 Drawing Sheets

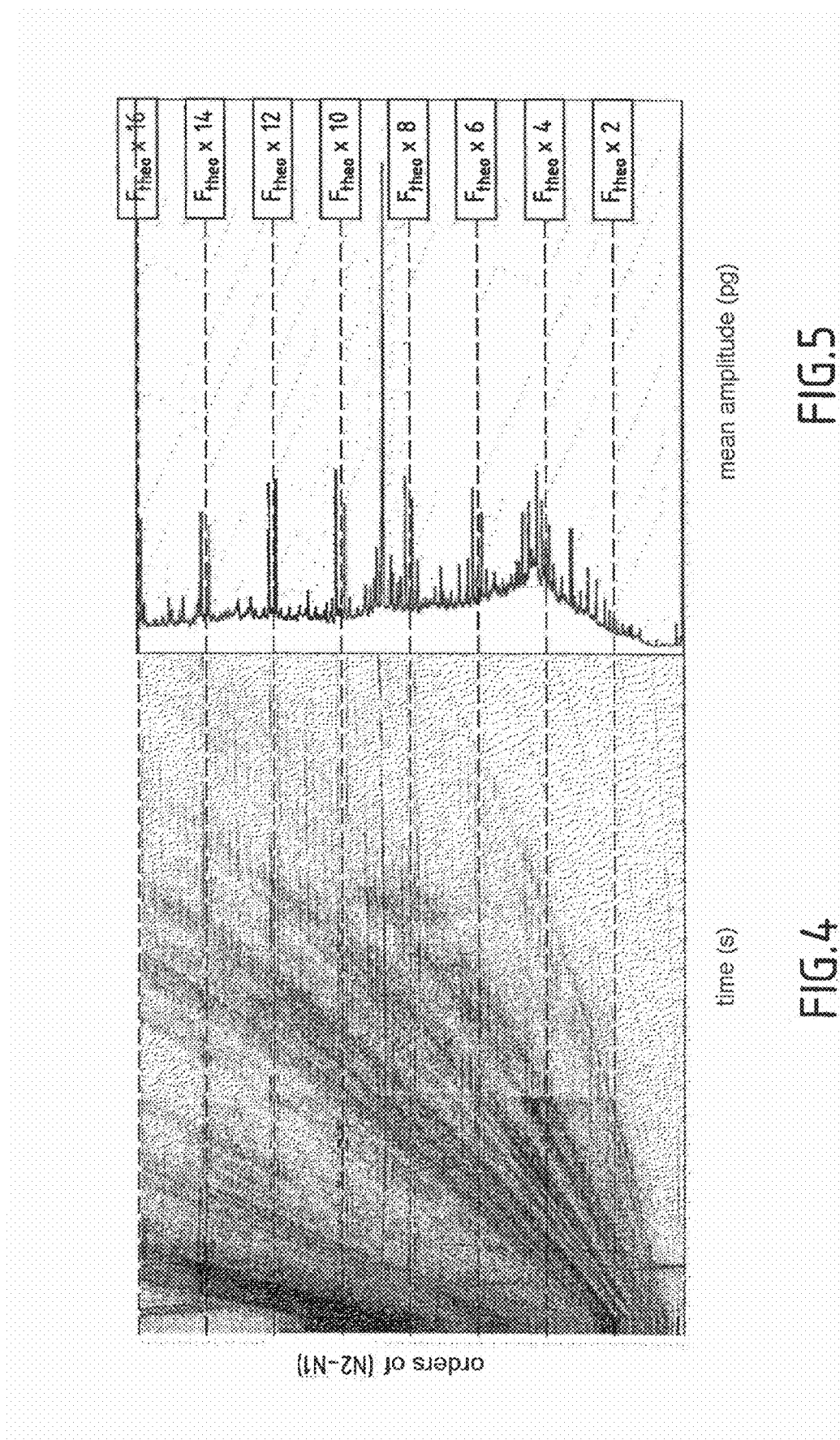

METHOD OF DETECTING DAMAGE TO AN ENGINE BEARING

BACKGROUND OF THE INVENTION

The present invention relates to the general field of monitoring wear in a bearing providing rotary support for at least one rotary shaft of an engine, for example an inter-shaft bearing in an aviation turbomachine.

Rolling bearings (ball bearings or roller bearings) are commonly used in the field of aviation, in particular for providing rotary support for the shafts of the high and low pressure spools of a turbomachine.

The wear of turbomachine bearings needs to be monitored in order to detect early any damage to a bearing, and thus anticipate breakage or serious malfunction of the bearing.

One of the known methods of monitoring wear in a turbomachine bearing is based on the principle whereby the frequency that results from damage to the bearing is proportional to the speed of rotation of the shafts or shaft supported by the bearing, and said frequency propagates in the form of vibration through the components of the turbomachine. Thus, that method consists in searching for vibration levels in components of the turbomachine while it is operating at high speeds. For that purpose, the method provides for acquiring a vibratory signal during a complete flight cycle, which signal is taken from one or more vibration sensors capable of detecting vibration in components of the turbomachine. Damage to a bearing is then detected on the basis of identifying levels of vibration that are above a predefined threshold representative of a sound bearing and for which a common factor has been identified. By way of example, reference can be made to European patent application EP 1 111 364 that describes an implementation of such a method.

Nevertheless, tests on damaged bearings have shown that damage is not always detected using such a method. The measurements from vibration sensors are "polluted" at high speeds of operation of the turbomachine by an environment that is naturally vibrating (combustion noise, noise caused by aerodynamic flow, numerous harmonics of the speeds of rotation of the high and low pressure shafts, etc.), which makes it difficult to discern the vibration levels that are characteristic of damage.

OBJECT AND SUMMARY OF THE INVENTION

The main object of the present invention is thus to mitigate such drawbacks by proposing a method that enables damage to a bearing providing rotary support to at least one rotary shaft of an engine to be detected reliably.

In accordance with the invention, this object is achieved by a method consisting in:

a) defining a measurement period corresponding to a range of speeds of rotation of the shaft during renewable activity at low speeds of operation of the engine;

b) acquiring over the entire measurement period a vibratory signal representative of acceleration of components of the engine;

c) sampling the vibratory signal as a function of the speed of rotation of the shaft during the measurement period;

d) transforming the sampled vibratory signal into a frequency signal to obtain frequency spectrum lines as a function of the speed of rotation of the shaft;

e) calculating the mean of the amplitudes of the spectrum lines;

f) determining amplitude peaks around multiples of the theoretical frequency of a damaged roller;

g) calculating the ratio between each amplitude peak and the amplitude level determined for a sound bearing; and h) comparing the ratio that is obtained with at least one predetermined damage threshold.

The method of the invention is remarkable in particular in that it provides for acquiring and processing the vibratory signal during renewable activity at low speeds of rotation of the engine. Thus, the vibratory environment is less polluted by noise (for example, with a turbomachine, there is little noise associated with combustion and with aerodynamic flow), thereby increasing the reliability of detection. Furthermore, it has been found that at low speeds of operation of the engine, the theoretical frequencies that are characteristic of damage to a bearing are lower than they are at high speeds, which means that it is possible to observe a greater number of bearing damage indicators at low speed than at high speed. As a result, damage to a bearing can be detected in particularly early manner.

According to an advantageous characteristic of the invention, step h) consists in comparing the ratio that is obtained with a low-damage threshold, and if the ratio is greater than the low-damage threshold, in comparing it with a high-damage threshold in order to determine the degree to which the bearing might be damaged.

The renewable activity at low speeds of operation of the engine that is selected for defining the measurement period may correspond to a stage during which the engine is being started or stopped. Starting and stopping stages correspond to low speeds of operation of the engine and they are renewable. In particular, applying the method of the invention during a stage of starting or stopping a turbomachine presents numerous additional advantages: the slack in a bearing tends to tighten during these stages, thereby amplifying manifestations of damage in the bearing, and thus making damage easier to detect; the method can be implemented at lower cost and on request, e.g. by launching an aborted start of the turbomachine.

The method of the invention can be applied with a bearing that provides rotary support to two rotary shafts of the engine. Under such circumstances, the measurement period corresponds to a range of speeds of rotation for one of the two shafts during activity of the engine at low speeds of rotation, and the vibratory signal is sampled as a function of the difference between the speeds of rotation of the two shafts during the measurement period.

Step f) may consist in determining amplitude peaks around even integer multiples of the theoretical frequency of a damaged roller.

BRIEF DESCRIPTION OF THE DRAWINGS

Other characteristics and advantages of the present invention appear from the following description made with reference to the accompanying drawings that show an implementation having no limiting character. In the figures:

FIGS. 3 to 6A-6C are graphs showing application examples of the FIG. 2 flow chart.

DETAILED DESCRIPTION OF AN IMPLEMENTATION

Figure 1:
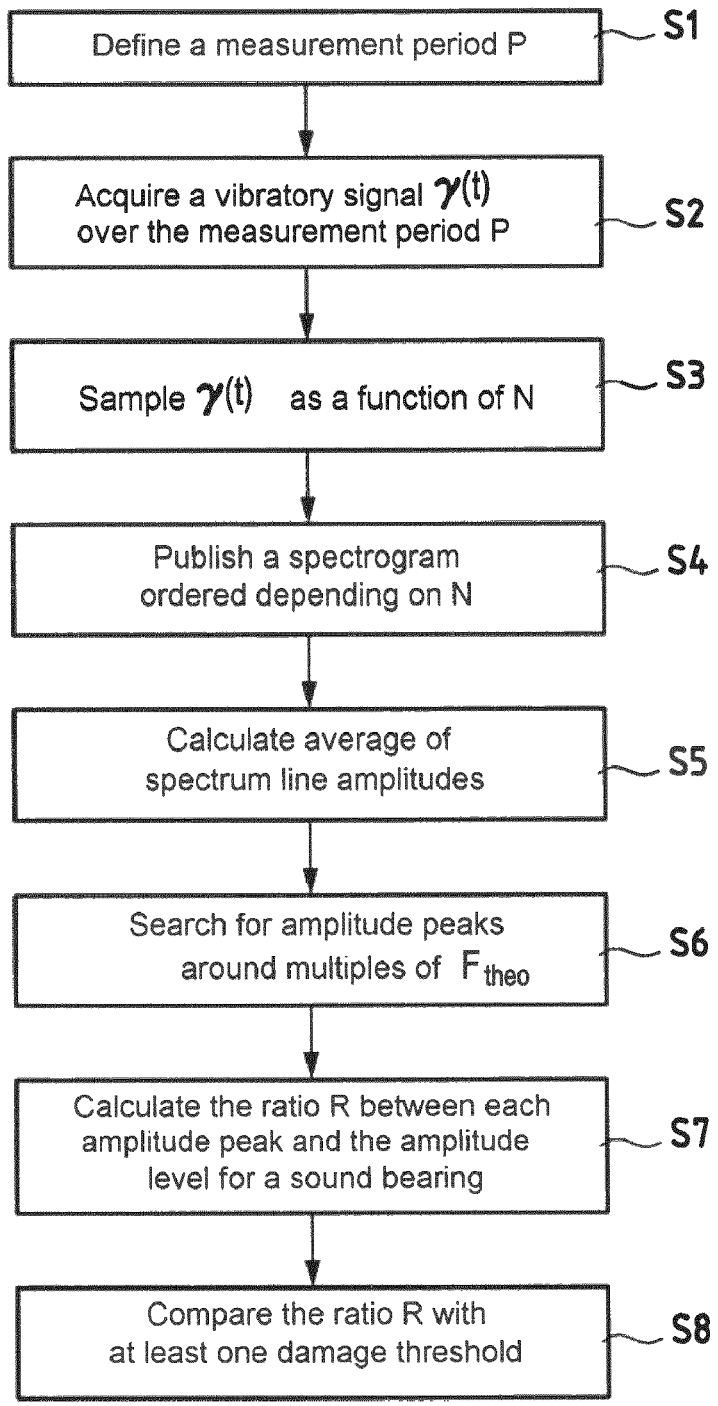
FIG. 1 is a diagram showing the various steps of an implementation of a method in accordance with the invention.

Reference is made to FIG. 1 which shows the steps making up a method in accordance with the invention for detecting damage to a rolling bearing providing rotary support for at least one rotary shaft of an engine.

In general, the invention applies to any type of engine that possesses at least one rotary shaft and at least one rolling bearing and that presents renewable activity at low speed (starting stage, stopping stage, idling, low-speed cycling, etc.). Amongst such engines, mention can be made, for example, of airplane or helicopter gas turbine engines (referred to as turbomachines), terrestrial gas turbines, gearboxes, axle engines, etc.

The principle on which the invention is based is that the frequency that results from bearing damage is proportional to the speed of rotation of the rotary shaft supported by the bearing. The assumption is that this frequency will be transmitted to an acceleration sensor via the components of the engine that are themselves vibrating, in particular at the fundamental frequencies.

A first step (S1) of the method in accordance with the invention consists in defining a measurement period P corresponding to a range of speeds of rotation N of the shaft during renewable activity at low speeds of operation of the engine.

The following step (S2) consists in acquiring over the entire measurement period P a vibratory signal $\gamma(t)$ representative of the acceleration of components of the engine. Such a signal comes from an acceleration sensor (e.g. an accelerometer or a strain gauge) previously placed on a stationary component of the engine.

The vibratory signal $\gamma(t)$ is subsequently sampled as a function of the speed of rotation N of the shaft over the measurement period P during a step S3.

The following step (S4) consists in transforming the sampled vibratory signal into a frequency signal in order to obtain frequency spectrum lines ordered depending on the speed of rotation N of the shaft, which corresponds to publishing a spectrogram ordered by N.

The time average of the amplitudes of the spectrum lines is then calculated (step S5) and a search is made for the amplitude peaks that are situated around multiples of the theoretical frequency $F_{theo}$ of a damaged bearing (step S6).

The ratio R between each amplitude peak and the amplitude level determined for a sound bearing is then calculated (step S7) in order to be compared with at least one predetermined damage threshold (step S8). As a function of the result of this comparison, it is possible to indicate whether the bearing is damaged or sound.

Figure 2:
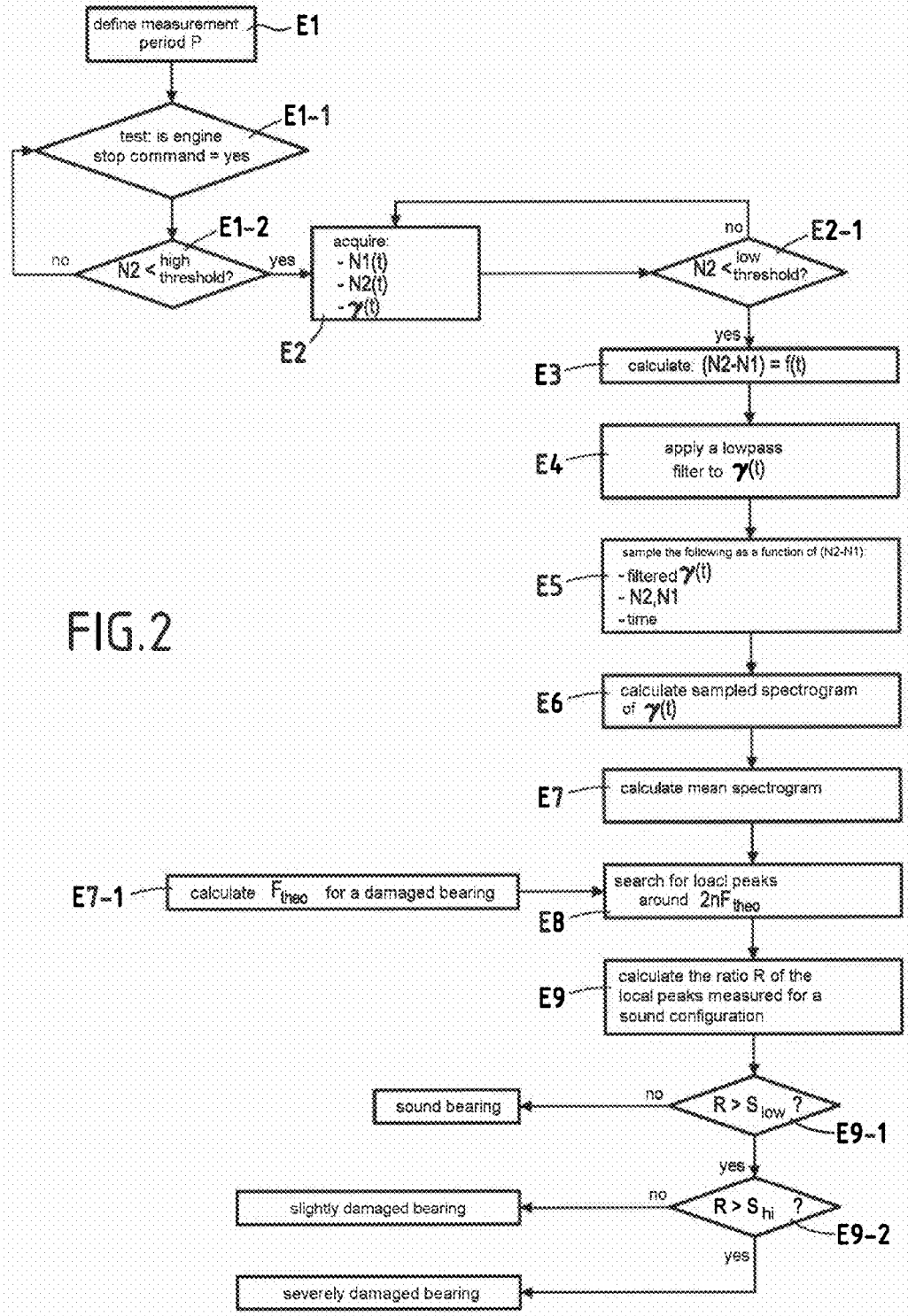
FIG. 2 is a flow chart showing the various steps of a method in accordance with the invention applied to detecting damage in an inter-shaft rolling bearing in an aviation turbomachine.

Reference is now made to FIG. 2 which is a flow chart showing one particular implementation of the various steps of a method in accordance with the invention.

In this particular implementation, attention is given to detecting damage to a roller bearing in an inter-shaft bearing of an aviation turbomachine. For example, such an inter-shaft bearing provides rotary support for a rotary shaft of a low pressure spool relative to a rotary shaft of a high pressure spool in the turbomachine.

In such a turbomachine, the present invention can also be used for detecting damage to a ball bearing or to a roller bearing providing rotary support to a single rotary shaft relative to a stator.

Furthermore, the particular implementation of the method of the invention described below applies to the stage of stopping the turbomachine, which is a renewable stage, and to operating at low speeds. The method could also apply to any other renewable low-speed stage of operation of the turbomachine (such as a starting stage, for example).

In the description below, N1 and N2 define the speeds of rotation respectively of the low pressure shaft and of the high pressure shaft of the turbomachine, which shafts are supported by the bearing.

The first step (E1) of the method in accordance with the invention consists in defining the measurement period P corresponding to a range of speeds of rotation for one of the two shafts of the turbomachine while the turbomachine is being stopped.

For a turbomachine, the measurement period P is defined as a function of the speed of rotation N2 of the high pressure shaft and the range of speeds of rotation is bounded between a low threshold of the order of a few hundreds of revolutions per minute (rpm) and a high threshold of the order of a few thousands of rpm.

The following step (E2) consists in acquiring digital signals over the entire measurement period P that are representative of the speeds of rotation N1 and N2 of the low and high pressure shafts, and a vibratory digital signal $\gamma(t)$ representative of the acceleration of components of the turbomachine.

The speeds of rotation N1 and N2 are measured using speed sensors placed on the shafts (such as digital tachometers, for example). The vibratory signal $\gamma(t)$ may come for example from an acceleration sensor placed on a stationary component of the turbomachine to provide assistance in balancing the turbomachine fan, in the usual way. The digital signals coming from the speed and acceleration sensors are sent to a computer having software appropriate for processing signals of this type.

In practice, the acquisition of the vibratory signal $\gamma(t)$ begins once a turbomachine stop command test gives a positive result (step E1-1) and the speed of rotation N2 of the high-pressure shaft drops below the high threshold defined for the measurement period P (step E1-2). Acquisition of the vibratory signal $\gamma(t)$ stops as soon as the speed of rotation N2 of the high pressure shaft drops below the previously defined low threshold (step E2-1).

The following step (E3) consists in using appropriate software to calculate the function of time f(t) that corresponds to the difference between the speed of rotation N2 of the high-pressure shaft and the speed of rotation N1 of the low-pressure shaft. This function f(t) is for use in calculating the cutoff frequency of a lowpass filter that is applied in a subsequent step and for sampling the signals.

Figure 3:
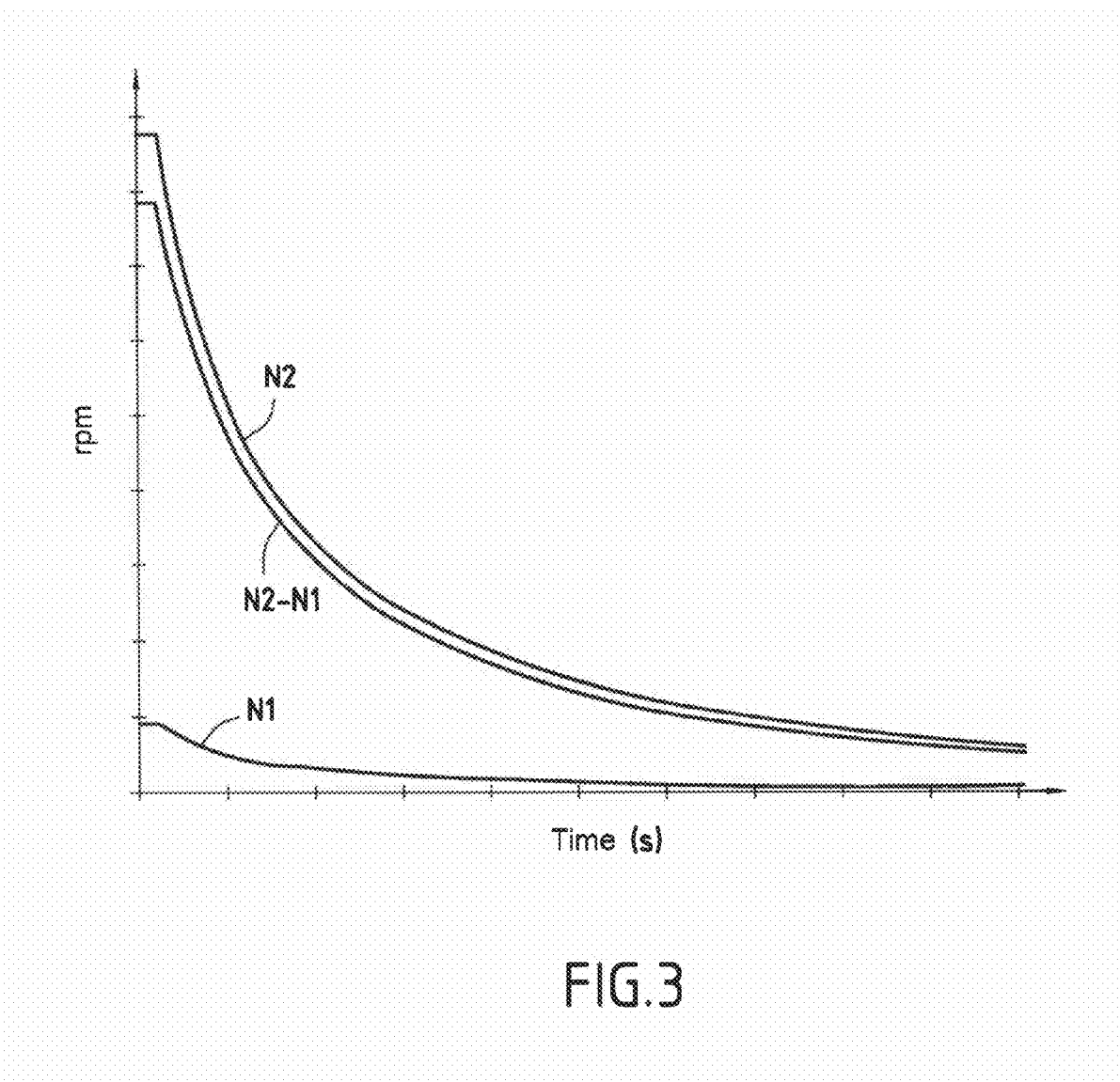

FIG. 3 shows the curves for the speeds of rotation N1 and N2 of the low- and high-pressure shafts of a turbomachine while the machine is being stopped. This figure also shows the curve N2-N1 that corresponds to the difference f(t) between these two speeds of rotation.

A lowpass filter with a cutoff frequency corresponding to f(N2−N1) is then applied to the vibratory signal $\gamma(t)$ in step E4. Applying this lowpass filter serves to eliminate a fraction of the fundamental frequencies of the turbomachine together with their harmonics.

The following step (E5) consists in sampling the following digital signals as a function of f(t) (i.e. as a function of the difference (N2−N1) between the speeds of rotation of the two shafts during the measurement period P): the previously-filtered vibratory signal $\gamma(t)$; a signal representing time; and the signals representing the speeds of rotation N1 and N2.

This sampling serves to produce signals for which resolution in terms of orders of (N2−N1) is constant.

On the basis of such sampling, the following step (E6) provides for transforming the sampled vibratory signal into a frequency signal (by applying a Fourier transform) so as to obtain frequency spectrum lines ordered as a function of N2−N1. This amounts to establishing a spectrogram showing the vibration frequencies ordered in multiples of N2−N1. FIG. 4 shows such a spectrogram (expressed in terms of "peak-g" (pg)) for a turbomachine, and while the speed of rotation N2 of the high pressure shaft drops from a few thousand rpm to a few hundred rpm.

Steps E5 and E6 of sampling signals and publishing a spectrogram by frequency transformation are well known in themselves to the person skilled in the art and they are therefore not described in detail herein. They are performed using computation software executed by the computer.

The mean of the amplitudes of the spectral lines of the spectrogram is then calculated in a step E7. FIG. 5 shows the result of such a calculation of averages on the basis of the spectrogram shown in FIG. 4. In FIG. 5, it can be seen that the amplitude peaks correspond to the horizontal lines of the spectrogram. As a result, everything that is not ordered as a function of (N2−N1) is attenuated by the effect of averaging, thus making it possible to show up the appearance of phenomena that are ordered as a function of N2−N1, e.g. a defect of the inter-shaft bearing.

Starting from this calculation of averages and a prior calculation of the theoretical frequency $F_{theo}$ of a damaged roller (step E7-1), amplitude peaks around multiples of the theoretical frequency $F_{theo}$ of a damaged roller are determined during a step E8. Such amplitude peaks characterize damage to the bearing.

The multiples of the theoretical frequency $F_{theo}$ of a damaged roller may be even integer multiples of $F_{theo}$ as shown in FIG. 5 (in FIG. 5, the frequencies that are even multiples of the theoretical frequency $F_{theo}$ are represented by the horizontal dashed lines). Alternatively, these multiples may be non-integer multiples and/or odd multiples of the theoretical frequency.

For an inter-shaft bearing, the theoretical frequency $F_{theo}$ of a damaged roller is calculated by applying the following formula:

$$F_{theo} = (D/(2d))(N2-N1)(1-(d/D)^2)$$

where D is the nominal diameter of the bearing, d is the diameter of a roller, and N1 and N2 are the respective speeds of rotation of the two shafts.

In general, the theoretical frequencies for damage in a bearing are functions that depend on the geometry of the bearing, of the number of rolling elements, and on the speeds of rotation of the shafts. This type of calculation is well known to the person skilled in the art.

The ratio R between each amplitude peak as determined in this way and the amplitude level as defined by a sound bearing is then calculated (step E9), and this ratio R is compared with at least one predetermined damage threshold (e.g. equal to 1) in order to determine whether the bearing is damaged.

For this purpose, the amplitude level for a sound bearing is defined from a mean estimated on various different sound engines and various different acquisitions during testing. As for the damage thresholds, they are defined from tests with the damaged bearing or from experience with damaged bearings similar to that for which the threshold are to be defined.

In an advantageous disposition of the invention, the ratio R between an amplitude peak and the amplitude level defined for a sound bearing is initially compared with a low-damage threshold $S_{low}$ (e.g. equal to 3) in a step E9-1, and then possibly compared with a high-damage threshold $S_{hi}$ (e.g. equal to 10) in a step E9-2. If the ratio R is less than the low threshold $S_{low}$, the bearing is considered as being sound. In contrast, if the ratio R is greater than $S_{low}$, the bearing is considered as being damaged. To determine the degree of damage, the ratio R is then compared with the high-damage threshold $S_{hi}$: if the ratio is less than $S_{hi}$, the bearing is considered as being slightly damaged; if the ratio is greater than $S_{hi}$, the bearing is considered as being severely damaged.

Figure 6A:
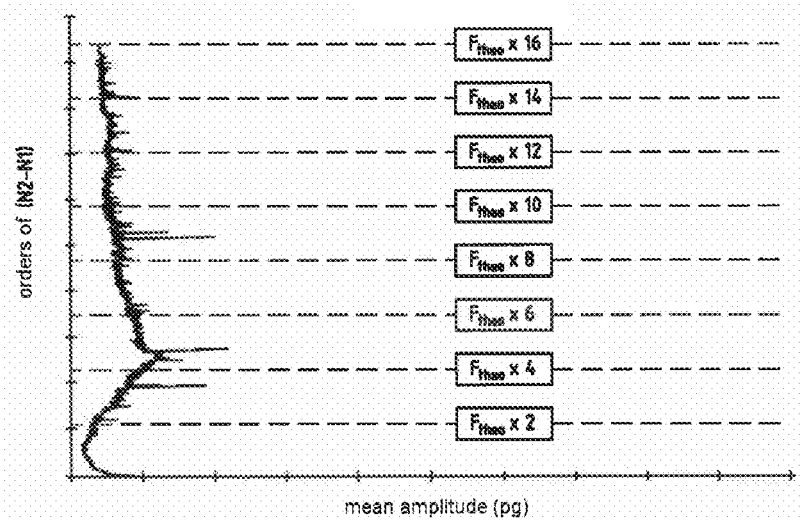
Figure 6B:
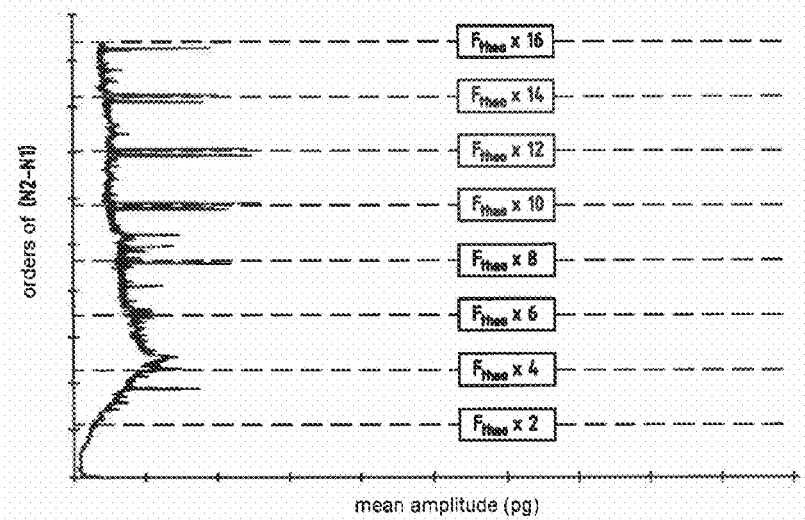
Figure 6C:
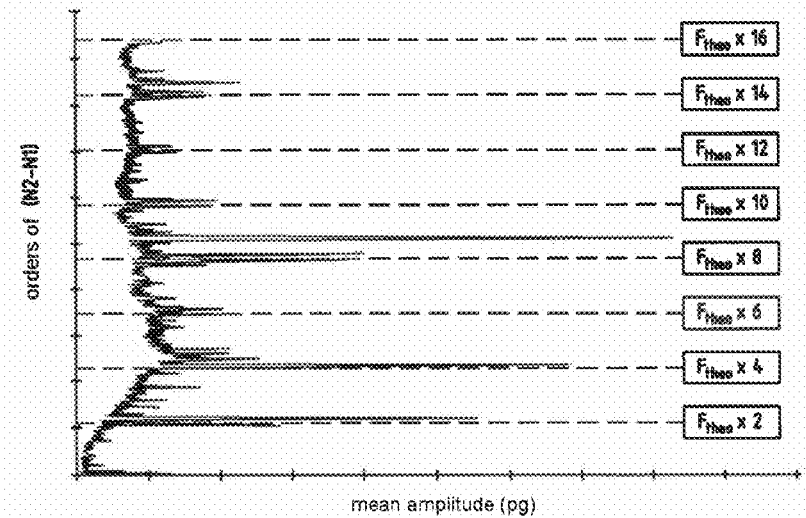

FIGS. 6A to 6C show how such an advantageous disposition is applied. These figures show the results obtained by the method in accordance with the invention for a damaged bearing at different stages during an endurance campaign. They are similar to FIG. 5 in that they show the mean calculation as performed on the basis of spectrograms published for different steps in the endurance campaign for an inter-shaft bearing of a turbomachine using the steps described above.

In FIG. 6A, the ratio $R_A$ between the amplitude peaks of the horizontal lines around the even multiples of the theoretical frequency for a damaged roller and the amplitude level as determined for a good roller is less than the low-damage threshold $S_{lo}$. As a result, the bearing as analyzed in this way is considered as being sound.

In FIG. 6B, the ratio $R_B$ between the amplitude peaks and the amplitude level determined for a sound bearing is greater than the low-damage threshold $S_{low}$ but less than the high-damage threshold $S_{hi}$. The bearing is thus considered as being slightly damaged (it can also be referred to as a bearing damaged at the beginning of the endurance campaign).

Finally, in FIG. 6C, the ratio $R_C$ between the amplitude peaks and the amplitude level as determined for a sound bearing is greater than the low-damage threshold $S_{low}$ and also greater than the high-damage threshold $S_{hi}$. The bearing is thus considered as being severely damaged (mention may also be made of a bearing damaged at the end of the endurance campaign).

Naturally, it is possible to envisage comparing the ratio R with some number of damage thresholds that is greater than 2 in order to further refine the degree of damage suffered by the bearing.

What is claimed is:

1. A method of detecting damage to a bearing providing rotary support to at least one rotary shaft of an engine, the method consisting in:
    a) defining a measurement period corresponding to a range of speeds of rotation of the shaft during renewable activity at low speeds of operation of the engine;
    b) acquiring over the entire measurement period a vibratory signal representative of acceleration of components of the engine;
    c) sampling the vibratory signal as a function of the speed of rotation of the shaft during the measurement period;
    d) transforming the sampled vibratory signal into a frequency signal to obtain frequency spectrum lines as a function of the speed of rotation of the shaft;
    e) calculating the mean of the amplitudes of the spectrum lines;
    f) determining amplitude peaks around multiples of the theoretical frequency of a damaged roller;
    g) calculating the ratio between each amplitude peak and the amplitude level determined for a sound bearing; and
    h) comparing the ratio that is obtained with at least one predetermined damage threshold.

2. A method according to claim 1, in which step h) consists in comparing the ratio that is obtained with a low-damage threshold, and if the ratio is greater than the low-damage threshold, in comparing it with a high-damage threshold in order to determine the degree to which the bearing might be damaged.

3. A method according to claim 1, in which the renewable activity at low speeds of rotation of the engine selected for defining the measurement period corresponds to a stage of starting or a stage of stopping the engine.

4. A method according to claim 1, in which the bearing supports two rotary shafts of the engine in rotation;
the measurement period corresponding to a range of speeds of rotation for one of the two shafts during the activity at low speeds of rotation of the engine; and the vibratory signal being sampled as a function of the difference between the speeds of rotation of the two shafts during the measurement period.

5. A method according to claim 1, in which the step f) consists in determining amplitude peaks around even integer multiples of the theoretical frequency of a damaged roller.

* * * * *